(12) United States Patent
Kamakura

(10) Patent No.: US 11,526,017 B2
(45) Date of Patent: Dec. 13, 2022

(54) OPTICAL DEVICE, WEARABLE DISPLAY DEVICE, AND LIGHT-GUIDING UNIT

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/001,702

(22) Filed: Aug. 25, 2020

(65) Prior Publication Data
US 2021/0063755 A1 Mar. 4, 2021

(30) Foreign Application Priority Data
Aug. 28, 2019 (JP) ............................. JP2019-155534

(51) Int. Cl.
*G02B 27/01* (2006.01)
*F21V 8/00* (2006.01)

(52) U.S. Cl.
CPC ....... *G02B 27/0176* (2013.01); *G02B 6/0078* (2013.01); *G02B 6/0086* (2013.01); *G02B 2027/015* (2013.01); *G02B 2027/0178* (2013.01)

(58) Field of Classification Search
CPC .............. G02B 27/017; G02B 27/0176; G02B 2027/0178; G02B 2027/015; G02B 6/0078; G02B 6/0086
See application file for complete search history.

(56) References Cited

U.S. PATENT DOCUMENTS

| 11,119,328 B2* | 9/2021 | Chester | .............. G02B 27/0172 |
| 2012/0200787 A1 | 8/2012 | Fujishiro | |
| 2016/0246059 A1* | 8/2016 | Halpin | ............... G02B 27/0176 |
| 2017/0192198 A1* | 7/2017 | Bristol | ...................... G02B 7/12 |
| 2018/0275409 A1* | 9/2018 | Gao | ..................... H04N 13/344 |
| 2019/0046044 A1* | 2/2019 | Tzvieli | ................. A61B 5/0833 |

FOREIGN PATENT DOCUMENTS

JP 2012163639 8/2012

* cited by examiner

*Primary Examiner* — Thomas A Hollweg
*Assistant Examiner* — Mary A El-Shammaa
(74) *Attorney, Agent, or Firm* — JCIPRNET

(57) ABSTRACT

The present disclosure includes a first optical member (light-guiding member) and a second optical member (light-guiding member) that are included in a first display device and a second display device configured to display images corresponding to left and right eyes and are configured to guide the images, a central member serving as a coupling member configured to couple these light-guiding members, and a protruding portion provided on the central member and extending in a lateral direction (±X direction) in which these light-guiding members are aligned.

10 Claims, 11 Drawing Sheets

OPTICAL DEVICE, WEARABLE DISPLAY DEVICE, AND LIGHT-GUIDING UNIT

The present application is based on, and claims priority from JP Application Serial Number 2019-155534, filed Aug. 28, 2019, the disclosure of which is hereby incorporated by reference herein in its entirety.

BACKGROUND

1. Technical Field

The present disclosure relates to an optical device applicable to a wearable display device that presents a virtual image to an observer, a wearable display device using the optical device, and a light-guiding unit applicable to the optical device and the wearable display device.

2. Related Art

For example, a virtual image display device capable of constituting a head-mounted display (HMD) being one aspect of a wearable display device has been known that a bridge portion is provided on a central portion of a rim that holds a pair of left and right light-guiding plate, and a notch portion for attaching a nose pad is formed in the bridge portion (JP-A-2012-163639).

In the device in JP-A-2012-163639, for example, when a reduction in size of the device is considered, a need for also reducing the size of the bridge portion or the central portion arises, and a problem that sufficient strength can be maintained in the notch portion and the like may occur.

SUMMARY

An optical device in one aspect of the present disclosure includes a first optical member and a second optical member configured to guide images corresponding to left and right eyes, a coupling member configured to couple the first optical member and the second optical member, and a protruding portion provided on the coupling member and extending in a lateral direction in which the first optical member and the second optical member are aligned.

DESCRIPTION OF EXEMPLARY EMBODIMENTS

A wearable display device serving as an optical device according to one exemplary embodiment of the present disclosure will be described below with reference to the drawings.

Figure 1:
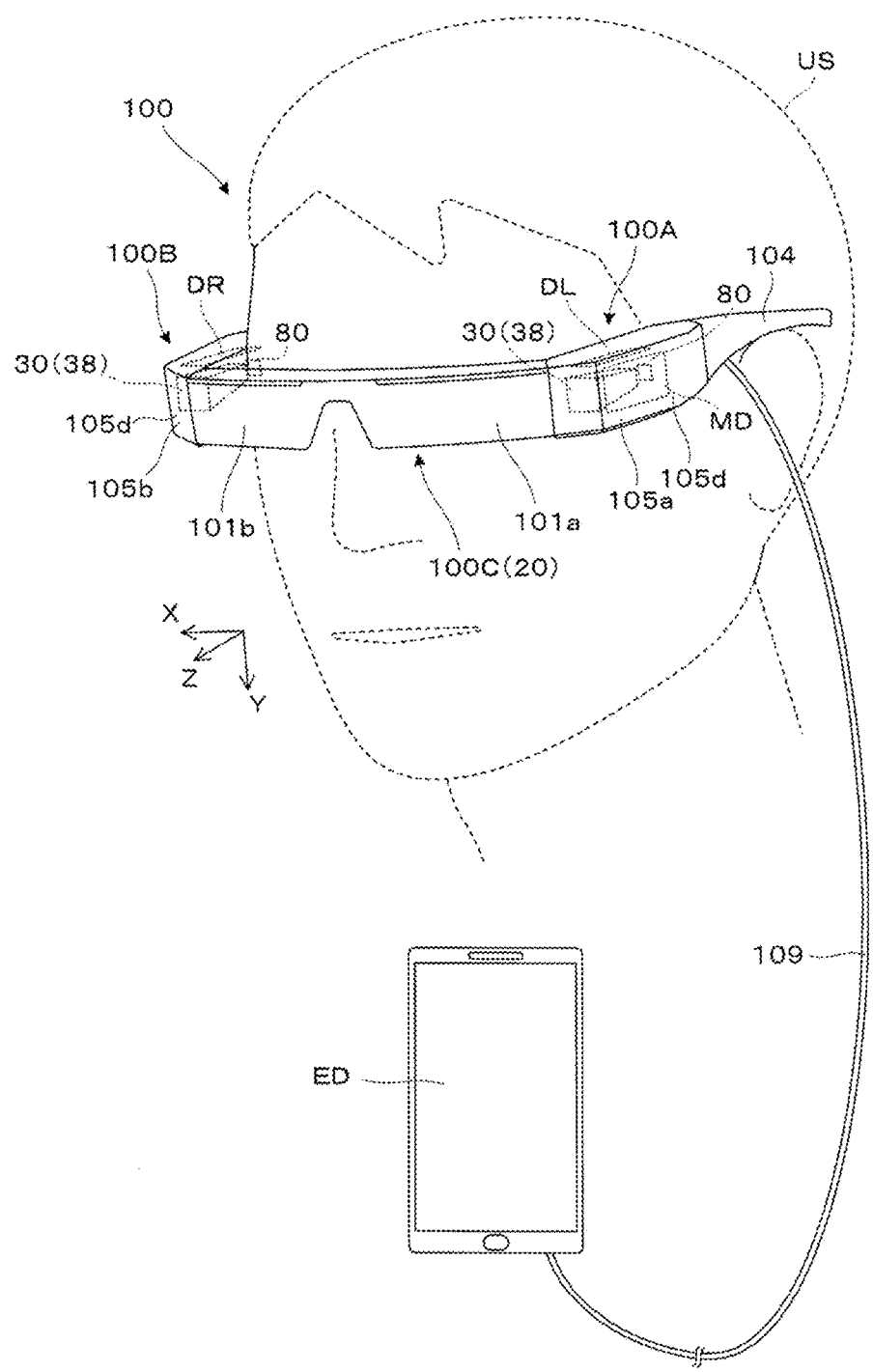
FIG. 1 is a perspective view for illustrating a use state of a wearable display device serving as an optical device according to an exemplary embodiment.

As illustrated in FIGS. 1 to 4, a wearable display device 100 serving as an optical device according to the exemplary embodiment is a head-mounted display (HMD) having an eyeglass-like appearance. In FIG. 1 and the like, X, Y, and Z are an orthogonal coordinate system, an +X direction corresponds to a lateral direction in which both eyes of an observer wearing the wearable display device 100 are aligned, a +Y direction corresponds to a downward direction orthogonal to the lateral direction in which both eyes of the observer are aligned, and a +Z direction corresponds to a forward direction or a front direction of the observer.

As illustrated in FIG. 1 and the like, the wearable display device 100 is an optical device that can not only cause an observer wearing the wearable display device 100 or a wearer US to visually recognize a virtual image, but can also cause the observer to observe an external image in a see-through manner. The wearable display device 100 can be communicatively coupled to a smartphone or another external device ED via a cable 109, and can form a virtual image corresponding to a video signal input from the external device ED, for example. Note that the wearable display device 100 is described here as an optical device or a virtual image display device that causes the virtual image described above to be visually recognized. However, in addition to the wearable display device 100 serving as such an optical device, a wearable display device also including a portion of the external device ED or a portion corresponding to the external device ED can also be regarded as the wearable display device. In other words, the wearable display device also including the external device ED can also be regarded as the wearable display device including an optical device constituted by a portion other than the external device ED.

The wearable display device 100 includes a first display device 100A and a second display device 100B. The first display device 100A and the second display device 100B are portions that respectively form a virtual image for a left eye and a virtual image for a right eye. The first display device 100A for the left eye includes a first virtual image forming optical portion 101a that transparently covers the front of the eye of the observer, and a first image forming body portion 105a that forms imaging light. The second display device 100B for the right eye includes a second virtual image forming optical portion 101b that transparently covers the front of the eye of the observer, and a second image forming body portion 105b that forms imaging light. In other words, images corresponding to the left and right eyes are displayed by the first display device 100A and the second display device 100B.

A temple 104 being a temple portion extending rearward from a side surface of the head is attached to a rear portion of the first and second image forming body portions 105a and 105b, and abuts ears, temples, and the like of the observer, thereby ensuring an attachment state of the wearable display device 100.

Figure 2:
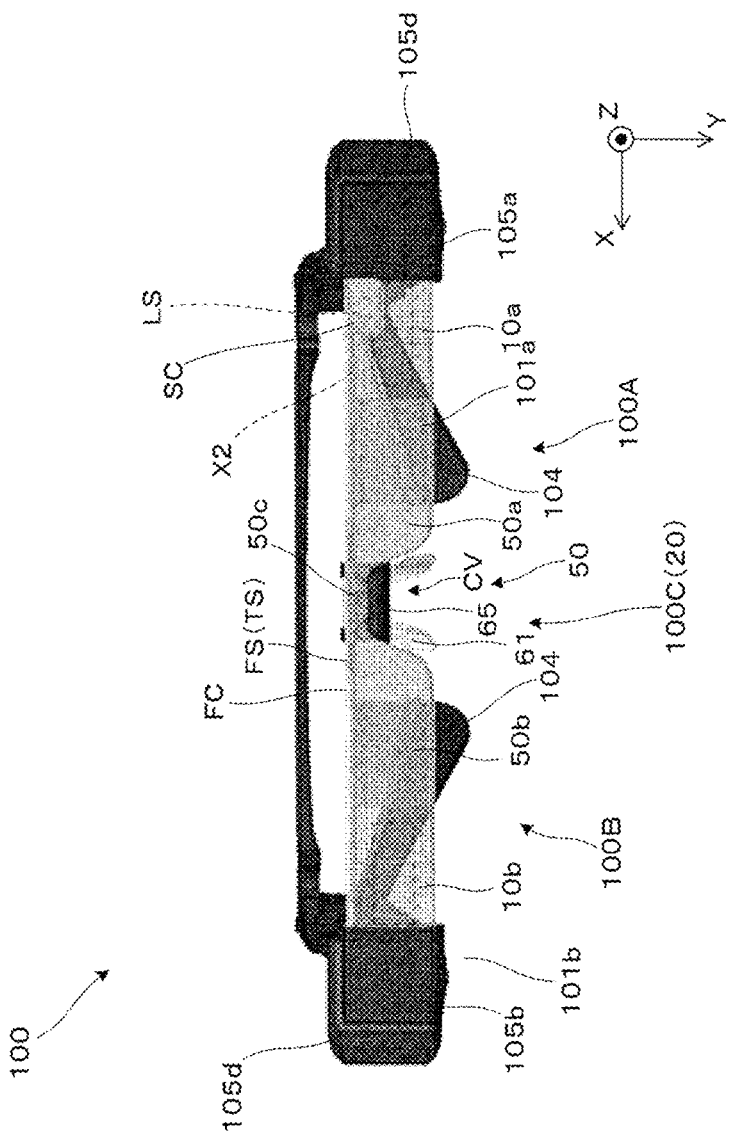
FIG. 2 is a front view illustrating one specific example of an appearance of the wearable display device.

Particularly, in the present exemplary embodiment, as illustrated in FIG. 2 and the like, a nose pad 61 that constitutes a support portion along with the temple 104 is provided in a recess CV formed between the first and second virtual image forming optical portions 101a and 101b. The nose pad 61 enables positioning of the virtual image forming optical portions 101a and 101b and the like relative to the eyes of the observer. Thus, the nose pad 61 is assembled to a central member 50 of a see-through light-guiding unit 100C that integrates the first display device 100A and the second display device 100B by a pad support device 65. Note that, although the nose pad 61 and the pad support device 65 are described as being separate herein, a nose pad can be regarded as including not only the nose pad 61 but also the pad support device 65. Note that the see-through light-guiding unit 100C and the central member 50 that constitutes the see-through light-guiding unit 100C will be described later.

Figure 4:
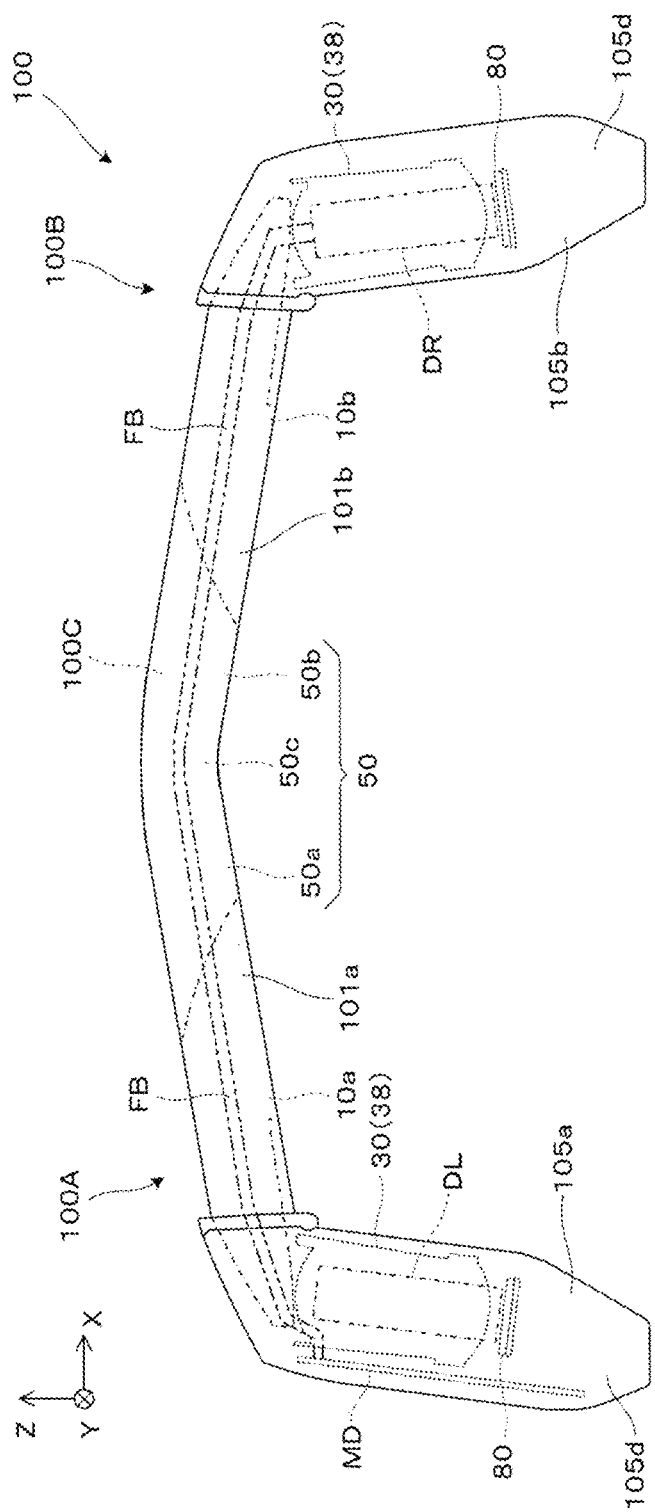
FIG. 4 is a plan view illustrating an optical configuration of the wearable display device.

The first and second virtual image forming optical portions 101a and 101b respectively include first and second light-guiding members 10a and 10b that are light-guiding bodies formed of a resin material and the like, and serve as an integral member by being coupled at the center by the central member 50 and form the see-through light-guiding unit 100C. In other words, the see-through light-guiding unit 100C is a light-guiding unit that includes the pair of light-guiding members 10a and 10b and the central member 50. The pair of light-guiding members 10a and 10b are a pair of optical members that contribute to formation of a virtual image while propagating imaging light internally by constituting the first and second virtual image forming optical portions 101a and 101b. In other words, the first light-guiding member 10a is a first optical member, and the second light-guiding member 10b is a second optical member, and thus they constitute a pair. The central member 50 includes a pair of light transmission portions 50a and 50b and a bridge portion 50c that couples the light transmission portions 50a and 50b, is an integrally molded part formed of a resin material and the like, and functions as a coupling member that couples the first display device 100A and the second display device 100B by the pair of light transmission portions 50a and 50b bonding to the pair of light-guiding members 10a and 10b. For more specific description, in the central member 50, the light transmission portion 50a being one of the pair of light transmission portions 50a and 50b is bonded to the light-guiding member 10a, and the other light transmission portion 50b is bonded to the light-guiding member 10b. Note that, in the illustrated example, as illustrated in FIG. 4, for example, a portion of the central member 50 from the bridge portion 50c to the light transmission portion 50a and a portion of the central member 50 from the bridge portion 50c to the light transmission portion 50b are smoothly coupled without having a curve portion (bent portion). The absence of a place such as a curve portion (bent portion) or a step portion avoids double external images being viewed.

Note that the see-through light-guiding unit 100C serves as a composite light-guiding device 20 that provides video for both eyes to the observer by light guiding, and is supported by an outer packaging 105d in both end portions, namely, on the outer end side of the light-guiding members 10a and 10b.

Figure 3:
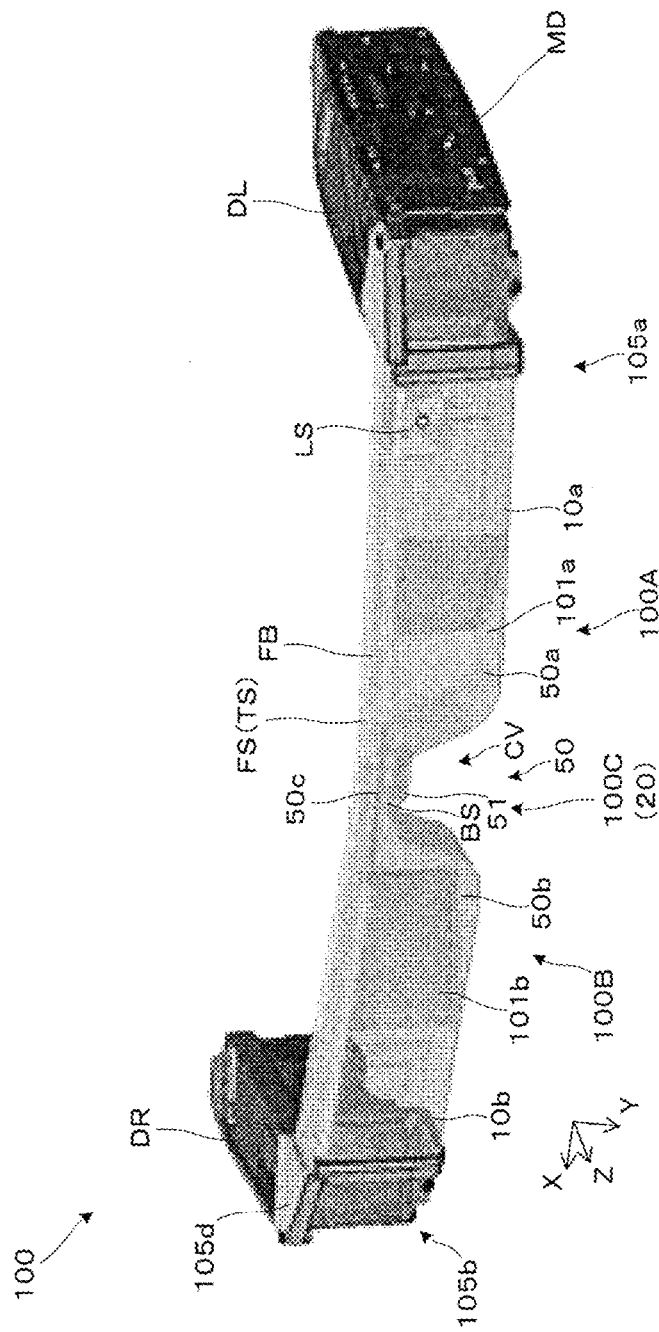
FIG. 3 is a perspective view illustrating an internal structure of the wearable display device.

In the central member 50, as illustrated in FIG. 3, the bridge portion 50c includes the recess CV formed as a recessed portion that is hollowed between the first display device 100A and the second display device 100B in a lower surface BS of the see-through light-guiding unit 100C, namely, a surface on the +Y side, and also includes a rib-like protruding portion (rib-shaped portion) 51 at a place of the recess CV. In other words, the protruding portion 51 is provided on the hollowed side of the recess-shaped portion formed as the recess CV.

The protruding portion 51 is provided so as to extend in the lateral direction in which the first light-guiding member 10a being the first optical member and the second light-guiding member 10b being the second optical member are aligned in the bridge portion 50c of the central member 50 serving as the coupling member, and reinforces strength of the bridge portion 50c at a place in which the recess CV is formed. Further, the protruding portion 51 functions as an attachment portion for attaching the pad support device 65 and thus the nose pad 61 (see FIG. 2) to the central member 50. A specific shape of the protruding portion 51, assembly of the nose pad 61, and the like will be described below in detail with reference to FIG. 5.

With regard to the central member 50 of the components described above, it can also be said from a different viewpoint that, the pair of light transmission portions 50a and 50b bonded to the pair of light-guiding members 10a and 10b in the central member 50 are a pair of end portions, and the bridge portion 50c is a lateral intermediate portion sandwiched between the light transmission portions 50a and 50b as the pair of end portions. Further, in this case, it means that the protruding portion 51 is provided on the lateral intermediate portion as described above of the central member 50.

Places of the see-through light-guiding unit 100C other than those described above will be described below. For example, as illustrated in FIG. 3, the see-through light-guiding unit 100C includes a flat surface FS being flush and extending from the first display device 100A to the second display device 100B as an upper surface TS, namely, a surface on the −Y side.

As illustrated in FIG. 2, a cover member FC (FPC cover) is provided as a cover structural portion on a further upper side of the upper surface TS of the see-through light-guiding unit 100C. A thin and narrow space is formed between the cover member FC and the see-through light-guiding unit 100C, and a cable FB that electrically couples the first image forming body portion 105a and the second image forming body portion 105b extends. Further, in a different viewpoint of the description above, the central member 50 serving as a coupling member includes the flat surface FS (upper surface TS) as a counter surface (surface on the +Y side) of the lower surface BS (surface on the +Y side) on which the protruding portion 51 is provided, and the cable FB can be disposed on the flat surface FS. In this way, a flexible board, namely, a flexible printed circuit (FPC) board can be adopted as the cable. In other words, as illustrated, it is assumed that the flexible board FB can be wired as the cable.

A structure other than the above-mentioned places of an internal structure of the wearable display device 100 and the like will be described below with reference to FIGS. 1 to 4 and the like as appropriate. As illustrated in FIG. 1, 3, or 4, the first image forming body portion 105a includes the display element 80, a lens barrel 38, a main printed wired board MD, a left eye printed wired board DL, and the like in the outer packaging 105d having a cover shape. On the other hand, the second image forming body portion 105b includes the display element 80, the lens barrel 38, a right eye printed wired board DR, and the like in the outer packaging 105d. Note that the outer packaging 105d of the first image forming body portion 105a may be referred to as a first outer packaging 105d for distinction. Similarly, the outer packaging 105d of the second image forming body portion 105b may be referred to as a second outer packaging 105d. Further, the outer packaging 105d is made of, for example, a magnesium alloy and the like.

For example, the display element 80 housed in the first outer packaging 105d in the first image forming body portion 105a is a display device that emits imaging light in order to form an image corresponding to a virtual image for the left eye, and is constituted by, for example, an organic EL display panel, an LCD panel, and the like. A projection lens 30 emits imaging light from the display element 80, and constitutes a part of an image formation system in the first virtual image forming optical portion 101a. The lens barrel 38 holds, as a part of the projection lens 30, an optical element for image formation (not illustrated) that constitutes the projection lens 30.

Note that, for the second image forming body portion 105b, the display element 80 housed in the second outer packaging 105d and the projection lens 30 including the lens barrel 38 also have the same function in order to form an image corresponding to a virtual image for the right eye.

The main printed wired board MD is a signal processing board that processes a signal including information from the outside. Here, the information from the outside is typically image data from the external device ED (see FIG. 1). The main printed wired board MD has a function of interfacing with the outside, and also manages and controls a display operation of the left eye printed wired board DL and the right eye printed wired board DR. Thus, for example, the main printed wired board MD is coupled to each component by the flexible board FB as a cable.

The left eye printed wired board DL is a drive printed wired board that drives the display element 80 in the first image forming body portion 105a, and operates under control of the main printed wired board MD.

Similarly, the right eye printed wired board DR is a drive printed wired board that drives the display element 80 in the second image forming body portion 105b, and operates under control of the main printed wired board MD.

In addition to the above, in the present exemplary embodiment, an illuminance sensor LS is provided as illustrated in FIGS. 2 and 3. The illuminance sensor LS is an ambient light sensor (ALS) and is an outside light sensor that measures ambient light intensity reacted by the observer. Thus, the illuminance sensor LS is disposed in the +Z direction corresponding to the forward direction or the front direction of the observer, and operates under control of the main printed wired board MD so as to be able to detect the amount of light entering the eye of the observer.

Note that various printed wired boards such as the main printed wired board MD are formed of wiring on a surface or inside an insulating resin board, and have a structure in which an IC or an electronic element is mounted on a surface thereof.

In the present exemplary embodiment, as previously mentioned, the flexible board FB is adopted as a cable for coupling the main printed wired board MD to each of the components described above. Although detailed description or illustration is omitted, for example, there are a plurality of flexible boards FB. For example, the right eye flexible board FB that couples the main printed wired board MD and the right eye printed wired board DR extends from the first display device 100A to the second display device 100B. In other words, the flexible board FB as the right eye flexible board extends along the flat surface FS that is an upper surface being flush and extending from the first display device 100A to the second display device 100B. Further, a left eye flexible board that couples the main printed wired board MD and the left eye printed wired board DL is provided. In addition, for example, a flexible board for an illuminance sensor that couples the main printed wired board MD and the illuminance sensor LS is provided. These flexible boards are wired in a state of overlapping each other as necessary.

Figure 5:
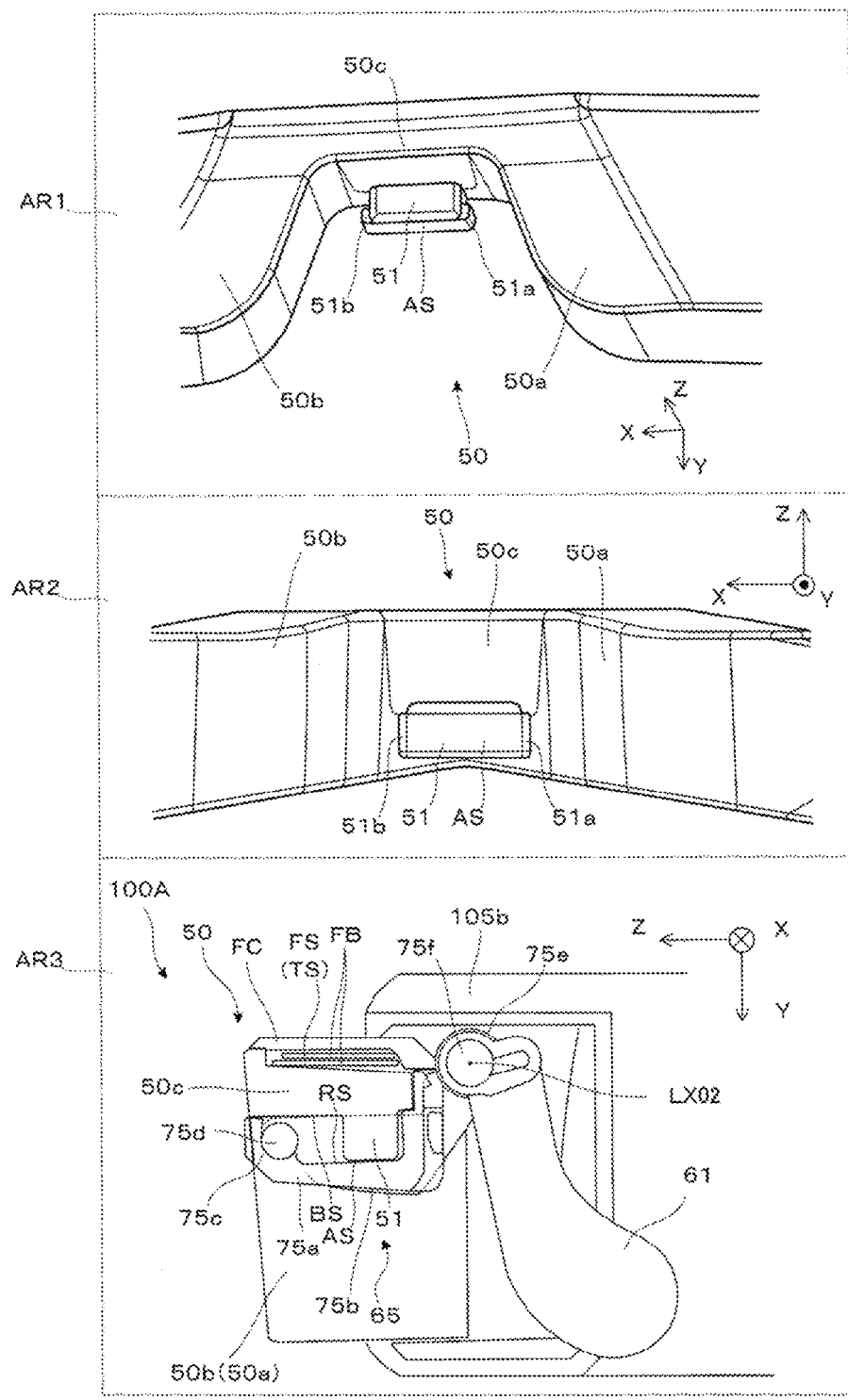
FIG. 5 is an explanatory diagram of a protruding portion (rib-shaped portion) of the wearable display device.

With reference to FIG. 5, a place to which the nose pad 61 of the wearable display device 100 serving as the optical device is assembled, that is, the protruding portion 51 and a place around the protruding portion 51 will be described below.

As previously mentioned, as a part constituting the bridge portion 50c of the central member 50 being an integrally molded part, the protruding portion 51 protrudes toward the +Y side in the lower surface BS, namely, the surface on the +Y side, and extends in the lateral direction (see FIG. 4 and the like) in which the first light-guiding member 10a and the second light-guiding member 10b are aligned. In other words, the protruding portion 51 extends in, as an extending direction, the ±X direction from the first light-guiding member 10a to the second light-guiding member 10b. Furthermore, for example, as illustrated in a perspective view of a first region AR1 and a bottom view of a second region AR2 in FIG. 5, the protruding portion 51 has a rib-like shape, and includes hook portions 51a and 51b at both ends in the extending direction. Note that the hook portions 51a and 51b are undercut during molding, and are formed by providing a slide core or the like as necessary during injection molding. The protruding portion 51 includes the pair of hook portions 51a and 51b at both ends, and thus the nose pad 61, more accurately, the pad support device 65 to which the nose pad 61 is attached can be attached, as illustrated in a side cross-sectional side view of a third region AR3. Further, since the protruding portion 51 has a structure that protrudes from the lower surface BS, namely, from the +Y side, the protruding portion 51 is formed in a position that hardly affects light guiding (see FIG. 8 described later) of imaging light.

Furthermore, in the example herein, as illustrated in the second region AR2, the protruding portion 51 is disposed offset toward a position of the central member 50 being a coupling member on a side close to a wearer when wearing. In other words, the protruding portion 51 is disposed offset toward the −Z side with respect to the Z direction.

Note that, as illustrated in the third region AR3, the pad support device 65 includes a fixing member 75a fixed to the protruding portion 51 of the bridge portion 50c, and an arm 75b that extends from the fixing member 75a. A bearing 75c that rotatably supports a shaft member 75d provided at a root of the arm 75b is formed on a front end side of the fixing member 75a. A bearing 75e that rotatably supports a shaft member 75f provided at a root of the nose pad 61 around a lateral horizontal axis LX02 is formed on a tip end of the arm 75b.

The assembly of the nose pad 61, namely, the pad support device 65 to the central member 50 will be described below with reference to FIG. 6. Note that, in the drawings, for the pad support device 65, only the fixing member 75a fixed to the protruding portion 51 of the central member 50 is illustrated, and other portions are omitted.

As illustrated, the fixing member 75a has a recessed portion shape so as to be fixed to the protruding portion 51, and is a resin material having elasticity that allows slight deformation. The fixing member 75a includes a receiving surface RS corresponding to an abutment surface AS being a lower end surface of the protruding portion 51, and a hole HL corresponding to the hook portion 51*a* of the protruding portion 51.

Figure 6:
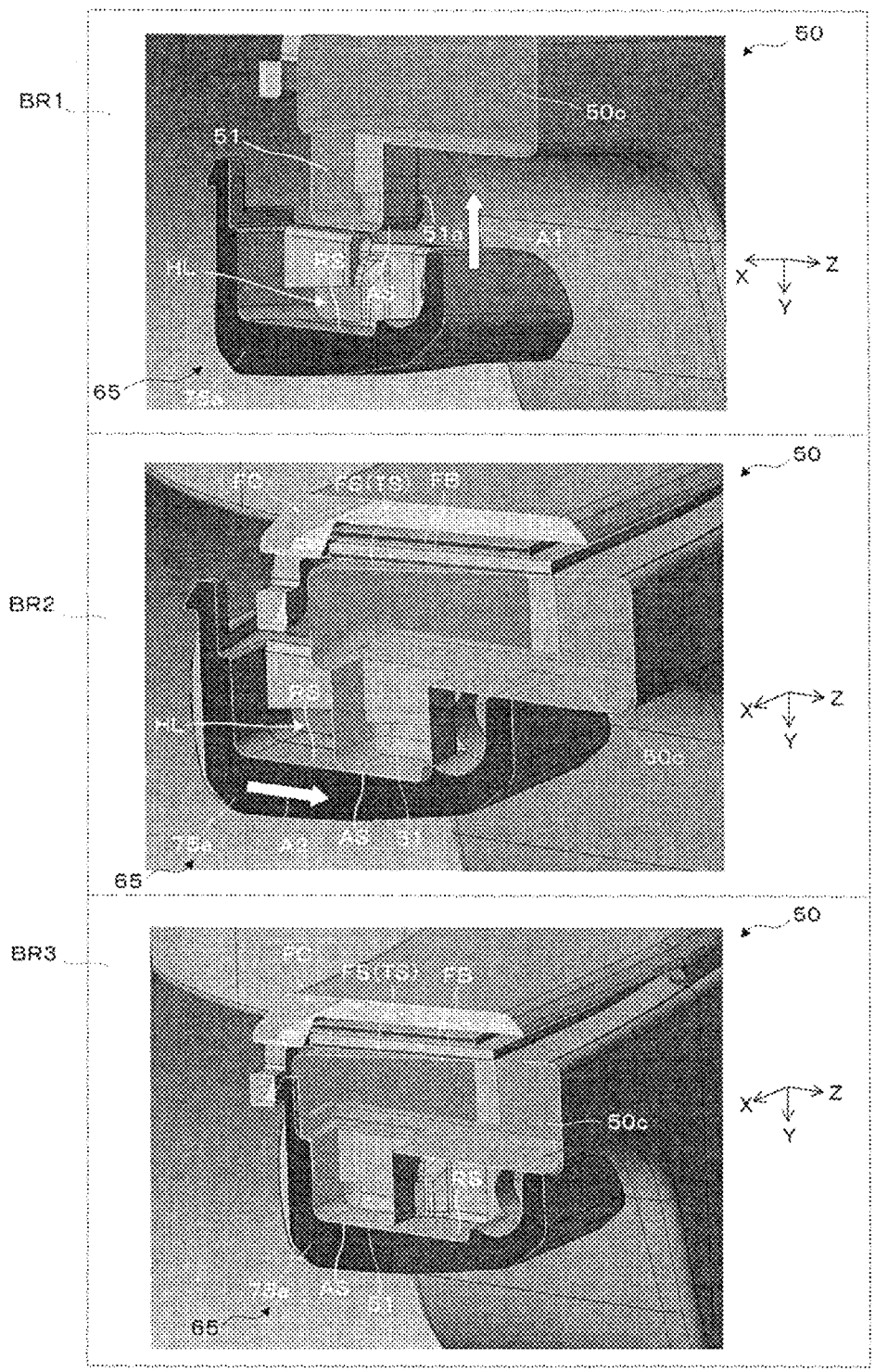
FIG. 6 is a perspective cross-sectional view for illustrating attachment of a nose pad to the protruding portion.

In FIG. 6, first, as illustrated in a first region BR1, the fixing member 75*a* is moved (brought closer to the protruding portion 51) from the lower side (+Y side) of the protruding portion 51 toward the upward direction (−Y direction) indicated by an arrow A1, and, as illustrated in a second region BR2, the receiving surface RS is brought into a state of abutting the abutment surface AS. Next, when the fixing member 75*a* is moved (slid) toward the front (+Z direction) indicated by an arrow A2, and the hole HL is brought closer to the hook portion 51*a*, the hook portion 51*a* is fitted into the hole HL in a position indicated in a third region BR3, and the hole HL is brought into a hooked state by the hooked portion 51*a*, thereby fixing the hook portion 51*a*. Note that, although the drawing and description are omitted, the same also applies to the other hook portion 51*b*.

As described above, the fixing member 75*a* and thus the pad support device 65 and, furthermore, the nose pad 61 are assembled and fixed to the central member 50. In other words, the protruding portion 51 allows, in the hook portions 51*a* and 51*b*, the nose pad 61 to slide and be inserted from the side (−Z side) close to the wearer US when wearing. For the assembly as described above, for example, each component of the nose pad 61 for attachment to the pad support device 65 can be disposed on the side (−Z side) close to the wearer. Therefore, after the assembly, the nose pad 61 can be set in an aspect where the nose pad 61 is not attached from a prominent place on the front side. Further, while wearing, the contact with a nose or the like generates a pressing force in the +Z direction, namely, in the same direction as the arrow A2, but such a force is less likely to be a force in a direction that disengages the hole HL and the hook portions 51*a* and 51*b*. Therefore, the nose pad 61 has a structure that is less prone to disengagement.

Figure 7:
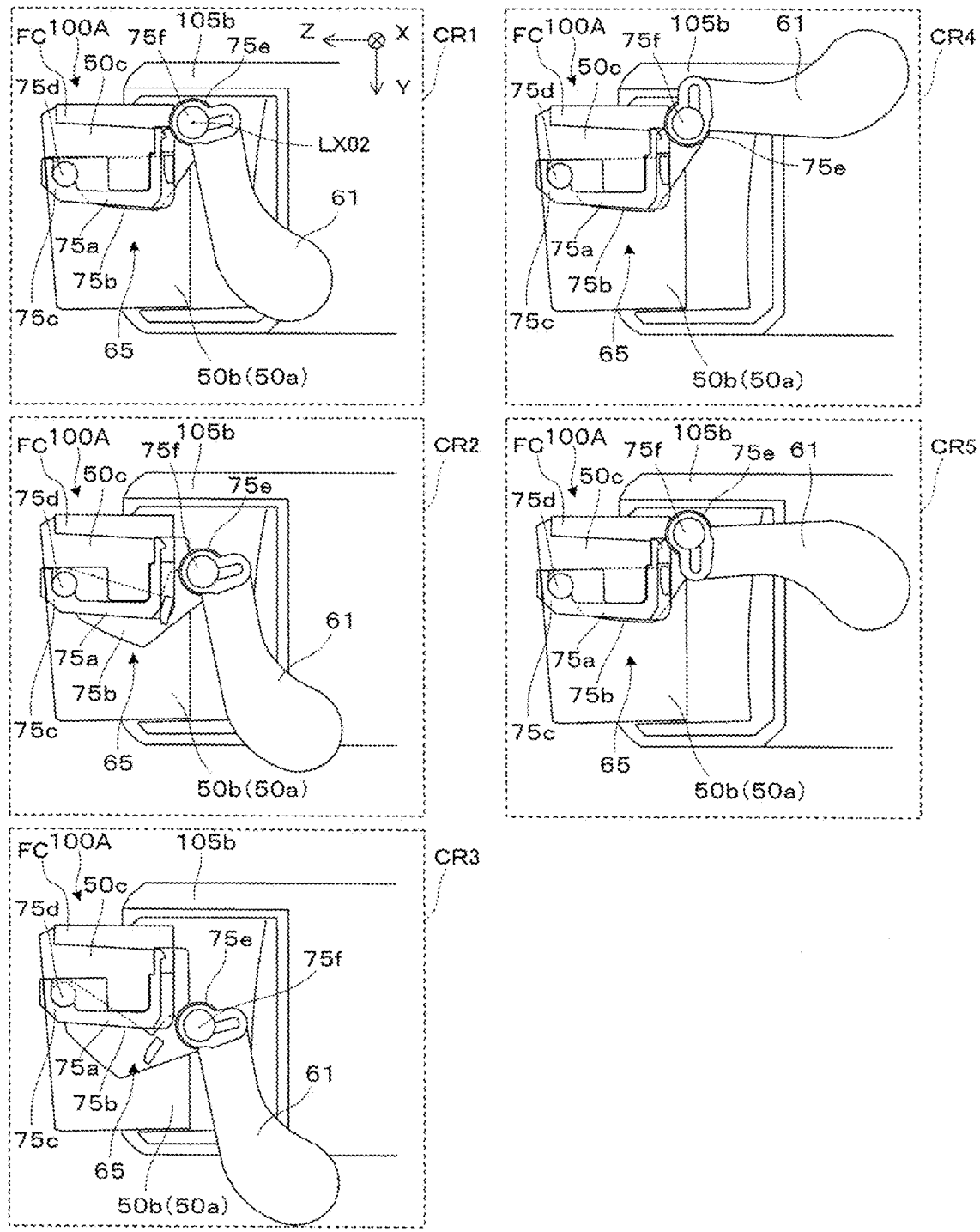
FIG. 7 is a cross-sectional view for illustrating a method for adjusting a posture of the nose pad.

The displacement of the nose pad 61 will be described below with reference to FIG. 7. FIG. 7 is a side view illustrating the displacement of the nose pad 61 provided on the pad support device 65 attached to the central member 50. In FIG. 7, first to fifth regions CR1 to CR5 illustrate a pattern of a change in arrangement including a posture of the nose pad 61.

A click engagement structure that achieves a loose lock at a predetermined angular interval, for example, is incorporated between the bearing 75*c* and the shaft member 75*d*, and a rotation angle of the arm 75*b* with respect to the fixing member 75*a* can be changed in a plurality of stages. Similarly, a click engagement structure that achieves a loose lock at a predetermined angular interval is incorporated between the bearing 75*e* and the shaft member 75*f*, and a rotation angle of the nose pad 61 with respect to the arm 75*b* can be changed in a plurality of stages. In other words, a posture of the arm 75*b* and the nose pad 61 can be adjusted by providing a constant or greater external force, but is semi-fixed so as not to change in a normal wearing state. A tip portion of the nose pad 61 can be freely displaced two-dimensionally along a YZ plane by adjusting a posture of the arm 75*b* and the nose pad 61. Specifically, as illustrated in the first to third regions CR1 to CR3, a height position, or arrangement in the ±Y direction with respect to the bridge portion 50*c* of the nose pad 61 can be changed without changing a posture of the nose pad 61. Further, as illustrated in the fourth region CR4, the nose pad 61 can be rotated greatly and have the posture extending horizontally. As illustrated in the fifth region CR5, the nose pad 61 can also be inverted and attached to the arm 75*b*. In this case, the bearing 75*e* provided on the tip of the arm 75*b* detachably supports the shaft member 75*f* provided at the root of the nose pad 61.

Figure 8:
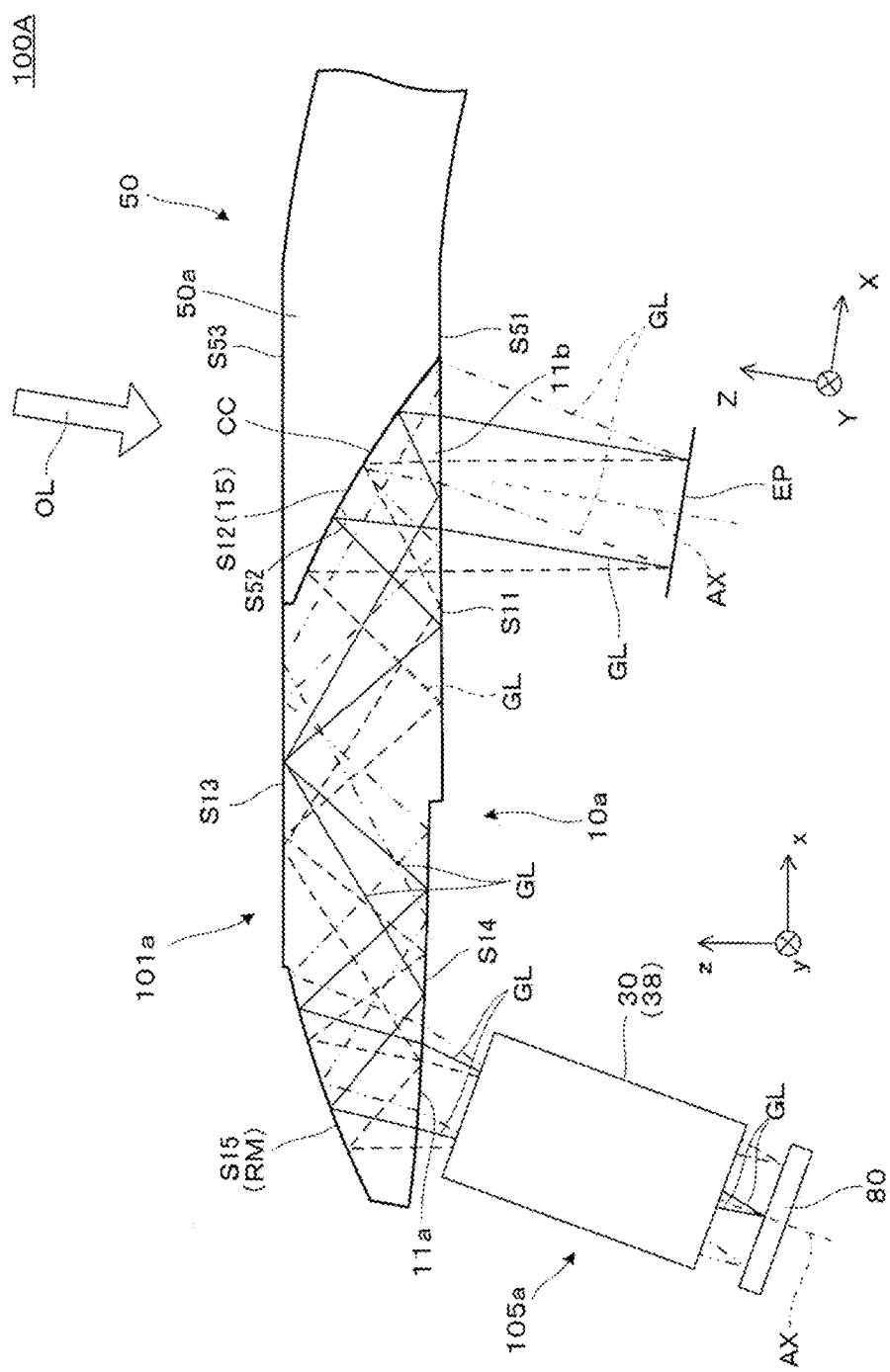
FIG. 8 is a plan view for illustrating an optical structure of the wearable display device.

An optical structure related to the wearable display device 100 will be described below with reference to FIG. 8. FIG. 8 is a diagram illustrating a part of the first display device 100A, and particularly illustrates an optical structure of the first virtual image forming optical portion 101*a*. As previously mentioned, the wearable display device 100 is constituted by the first display device 100A and the second display device 100B (see FIG. 1 and the like), and the first display device 100A and the second display device 100B also have a left-right symmetric and equivalent structure. Thus, only the first display device 100A will be described, and the description of the second display device 100B will be omitted. Note that, in FIG. 8, x, y, and z are an orthogonal coordinate system, and x and y directions are parallel to a first surface S11 and a third surface S13 of first to fifth surfaces S11 to S15 having an optical function upon light guiding of imaging light in the light-guiding member 10*a*, and a z-direction is perpendicular to the first surface S11 and the third surface S13.

The light transmission portion 50*a* is a member that is fixed integrally with the light-guiding member 10*a*, and assists in a see-through function of the light-guiding member 10*a*. The light transmission portion 50*a* includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light-guiding member 10*a*, the second transmission surface S52 is a curved surface that is bonded to and integrated with the second surface S12, and the third transmission surface S53 is on an extended surface of the third surface S13 of the light-guiding member 10*a*.

The light-guiding member 10*a* of the first virtual image forming optical portion 101*a* is bonded to the light transmission portion 50*a* via an adhesive layer CC. In other words, the second transmission surface S52 of the light transmission portion 50*a* is disposed so as to face the second surface S12 of the light-guiding member 10*a* and has the same shape. The light-guiding member 10*a* and the light transmission portion 50*a* have a structure in which a surface of a body member that gives a three-dimensional shape including an optical surface is covered with a thin hard coat layer. The body member of the light-guiding member 10*a* and the light transmission portion 50*a* is formed of a resin material with high optical transparency in a visible range, and is molded by, for example, pouring a thermoplastic resin into a metal mold and curing the resin.

An outline of the optical path of imaging light GL will be described below. The light-guiding member 10*a* guides the imaging light GL emitted from the projection lens 30 toward the eye of the wearer US by reflecting the imaging light GL by the first to fifth surfaces S11 to S15 and the like. Specifically, the imaging light GL from the projection lens 30 is first incident on a portion of the fourth surface S14 formed on a light incidence portion 11*a* and reflected by the fifth face S15 being an inner surface of a reflection film RM, is incident again from the inner side on the fourth surface S14 and is totally reflected, is incident on and totally reflected by the third surface S13, and is incident on and totally reflected by the first surface S11. The imaging light GL totally reflected by the first surface S11 is incident on the second surface S12, is partially reflected while partially passing through a half mirror 15 provided on the second surface S12, and is incident again on and passes through a portion of the first surface S11 formed on a light emitting portion 11b. The imaging light GL passing through the first surface S11 travels as a whole along an optical axis AX that is substantially parallel to the Z direction, and is incident as a substantially parallel light flux on an exit pupil EP in which the eye of the wearer US is disposed. In other words, the wearer US observes an image formed by the imaging light as a virtual image.

The first virtual image forming optical portion 101a causes the wearer US to visually recognize the imaging light by the light-guiding member 10a, and causes the wearer US to observe an external image having little distortion in a combined state of the light-guiding member 10a and the light transmission portion 50a. At this time, since the third surface S13 and the first surface S11 are flat surfaces substantially parallel to each other, diopter is substantially 0 with respect to observation of light passing through the portion, and almost no aberration or the like occurs in external light OL. Further, the third transmission surface S53 and the first transmission surface S51 are flat surfaces that are substantially parallel to each other. Furthermore, since the first transmission surface S51 and the first surface S11 are flat surfaces that are substantially parallel to each other, almost no aberration or the like occurs. As described above, the wearer US observes an external image that has no distortion through the light transmission portion 50a.

As described above, the wearable display device 100 serving as the optical device according to the present exemplary embodiment includes the first optical member (light-guiding member 10a) and the second optical member (light-guiding member 10b) that are included in the first display device 100A and the second display device 100B configured to display images corresponding to left and right eyes, and are configured to guide the images, the central member 50 being the coupling member configured to couple the light-guiding member 10a and the light-guiding member 10b, and the protruding portion 51 provided on the central member 50, and extending in the lateral direction (±X direction) in which the light-guiding member 10a and the light-guiding member 10b are aligned. In this case, the central member 50 serving as the coupling member is provided with the protruding portion 51, and thus holding strength at a coupling place can be maintained when the light-guiding member 10a and the light-guiding member 10b that constitute the first display device 100A and the second display device 100B are coupled together while maintaining a reduction in size of the wearable display device 100. Therefore, distortion, deformation, and the like in each component constituting a device such as the see-through light-guiding unit 100C, for example, can be suppressed.

Figure 9:
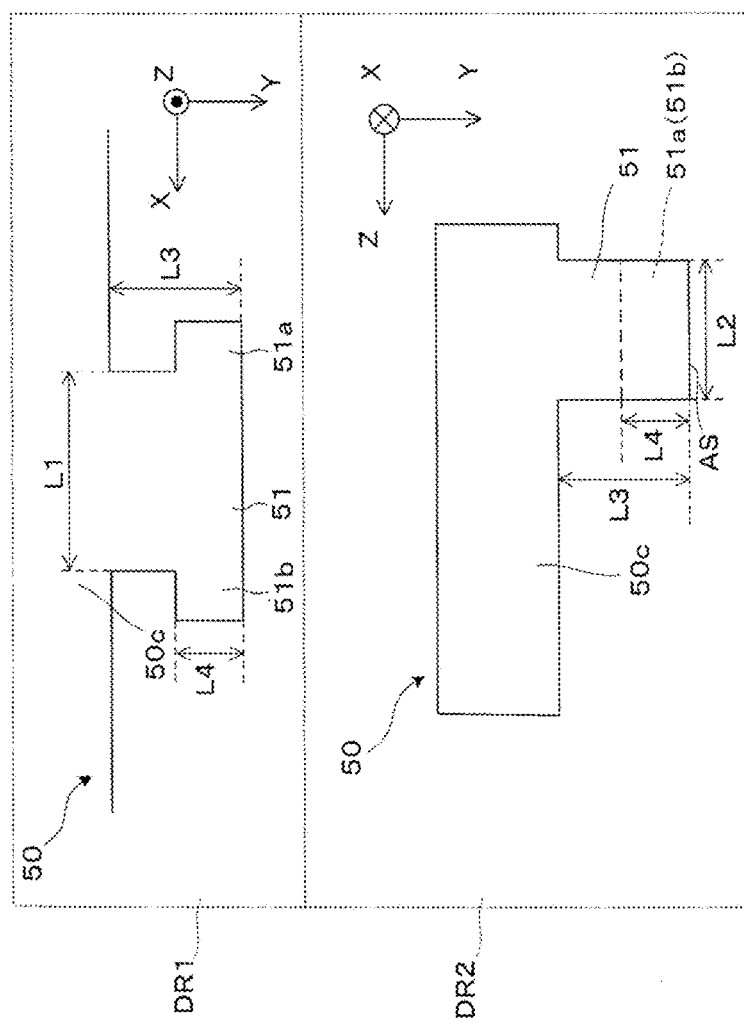
FIG. 9 is a conceptual diagram for illustrating one example of dimensions related to a part of the wearable display device.

One example of dimensions of the protruding portion 51 and a periphery thereof in the wearable display device 100 will be described below with reference to a conceptual diagram illustrated in FIG. 9. In FIG. 9, a first region DR1 is a front view conceptually illustrating the protruding portion 51 and the periphery thereof, and a second region DR2 is a side view.

As illustrated in the drawing and as previously mentioned, the protruding portion 51 is a rib-like member extending in the right-left direction (X direction), that is, has a certain width in the X direction, and a range extending in the front-back direction (Z direction) is relatively longer than a range in the vertical direction or the height direction (Y direction). Thus, in the present exemplary embodiment, the protruding portion 51 has a rib shape that extends in the X direction. However, the protruding portion 51 functions as a reinforcing member by also having a certain thickness in the Z direction and the Y direction.

For example, in the X direction, a length (thickness) L1 of a portion of the protruding portion 51 other than the hook portions 51a and 51b protruding to the left and right is, for example, approximately 7 mm. In contrast, a thickness in the front-back direction (Z direction) and the height direction (Y direction) is, for example, approximately 3 mm. In other words, a thickness L2 in the front-back direction (Z direction) and a thickness L3 in the height direction are approximately a half and at least equal to or greater than ⅓ of the thickness L1 in the X direction.

Further, the thickness L2 in the front-back direction (Z direction) of the protruding portion 51 is equal to or greater than ¼ of the thickness C2 in the front-back direction of the central member 50, and the thickness L3 in the height direction is equal to or greater than ⅔ of a thickness C3 in the height direction of the central member 50. The protruding portion 51 can reinforce sufficient strength by having the certain thickness described above with respect to the central member 50.

Note that a thickness L4 in the height direction of the hook portions 51a and 51b is set to, for example, approximately 1 mm, and thus has strength sufficient enough to support and fix the nose pad 61 (see FIG. 5 and the like).

Figure 10:
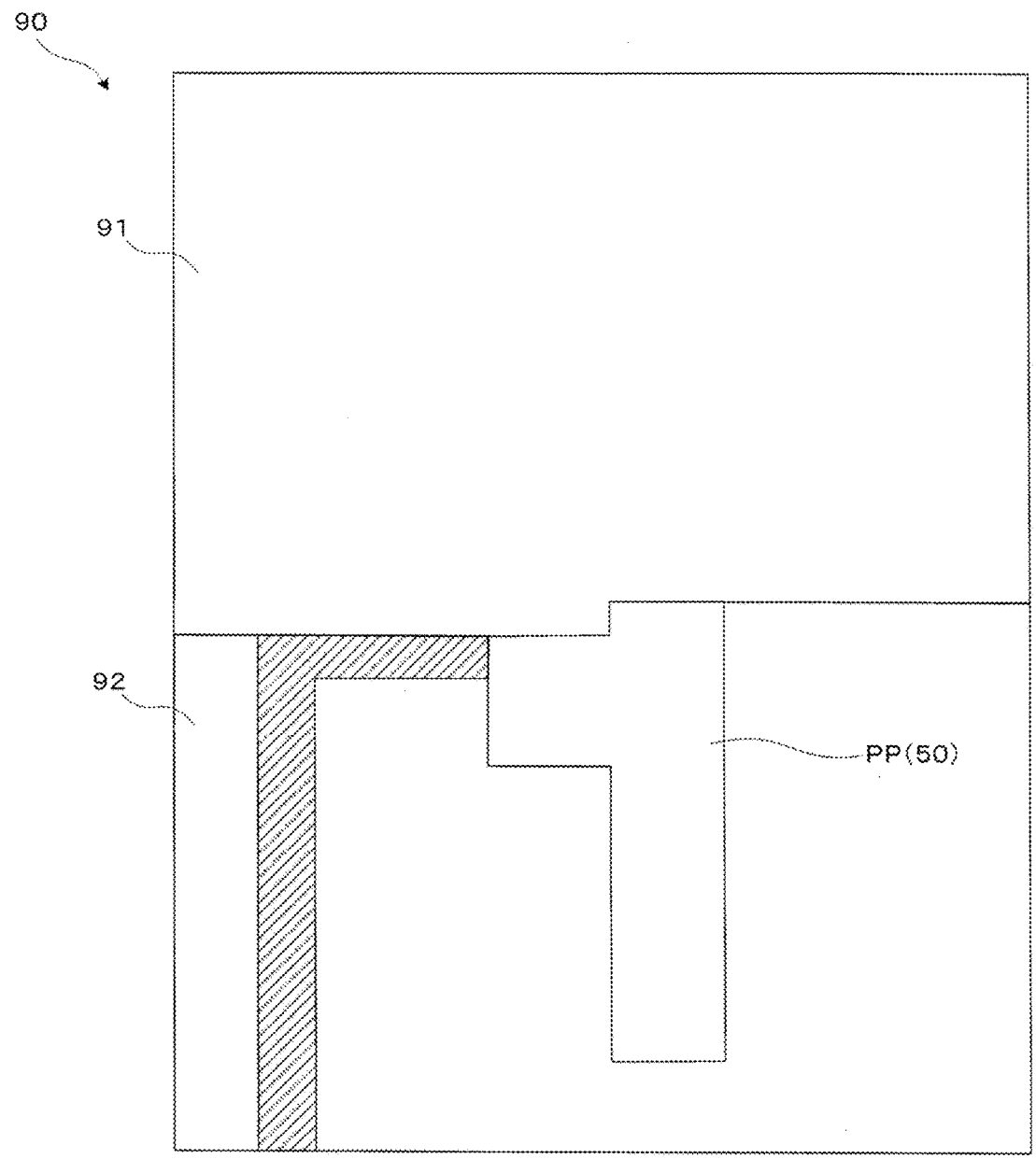
FIG. 10 is a cross-sectional view for illustrating molding of a portion including the protruding portion.

With reference to a cross-sectional view illustrated in FIG. 10, molding of a portion of the central member 50 that includes the protruding portion (rib-shaped portion) 51 will be described below. As previously mentioned, the central member 50 is a resin member formed by injection molding, and, as illustrated, the protruding portion 51 is a gate portion upon injection molding of the central member 50. Particularly, in the illustrated example, a part of the lower end surface of the protruding portion 51 is a gate. By using the protruding portion 51 located at the center of left-right symmetry of the central member 50 as a gate, a resin flow can be improved, and the resin material can spread across the entire mold.

A molding die 90 is constituted by including a first die 91 and a second die 92, and can mold a resin molding member PP that is to become the central member 50 by sandwiching the first die 91 and the second die 92 and clamping both of the dies 91 and 92. In other words, a molten resin flows into an internal space formed in both of the dies 91 and 92 in the clamped state from a gate being an inlet of the resin, and an operation such as heating, cooling, pressing, and depressurizing is performed as appropriate, and thus the resin molding member that is to become the central member 50 is formed in the internal space. Note that, although a detailed description is omitted, a taper is provided as appropriate in each component due to a request for a mold release, and both of the dies 91 and 92 are further divided into multiple dies due to the presence of an undercut. In the case above, a coupling member can be molded with high accuracy, and the protruding portion 51 can be integrally formed with the other portion that constitutes the central member 50.

Figure 11:
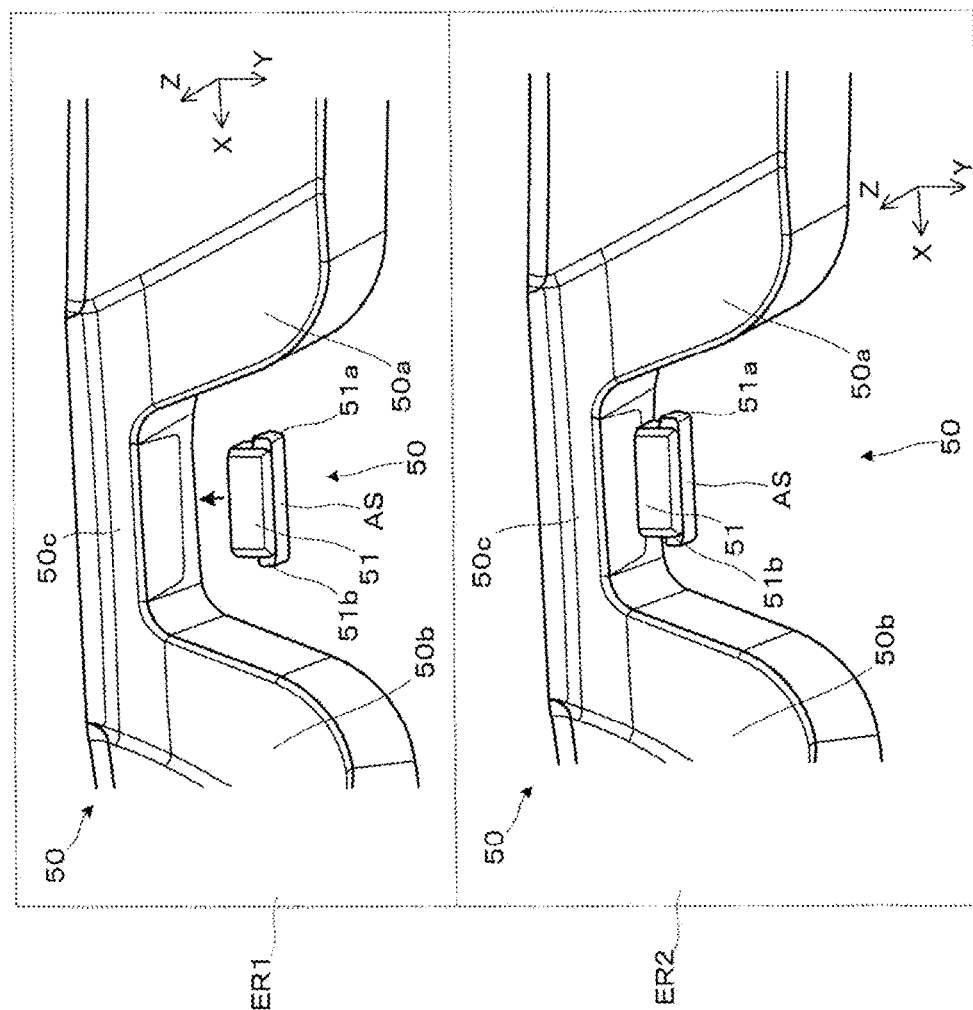
FIG. 11 is an explanatory diagram of an optical device according to one modified example.

The wearable display device 100 according to one modified example will be described below with reference to FIG. 11. Note that FIG. 11 is a diagram corresponding to the first region AR1 in FIG. 5. In the example described above, the protruding portion 51 is integrally formed, but, as illustrated in FIG. 11, the protruding portion 51 may be a separate member that is attached and fixed to the central member 50. In other words, as illustrated in a first region ER1 in FIG. 11, when the central member 50 is manufactured, the protruding portion 51 is not provided and is manufactured separately from the central member 50, and, as illustrated in a second region ER2, the protruding portion 51 may be retrofitted to a suitable place of the central member 50 by adhesive fixing and the like. In other words, in manufacturing of the central member 50, a member that can reinforce strength sufficient for the protruding portion 51 may be added by retrofitting.

MODIFIED EXAMPLE AND OTHER MATTER

The structure described above is illustrative, and various modifications can be made to the extent that similar functions can be achieved.

The mechanical structure of the pad support device 65 illustrated above is merely illustrative, and modifications can be made to the structure to the extent that similar functions can be achieved. Further, the attaching method illustrated in FIG. 6 is not limited thereto, and various aspects can be adopted. Further, in FIG. 5, the protruding portion 51 is disposed offset in a position on the side close to the wearer US, but a configuration in which there is no position offset in the front-back direction or, conversely, the protruding portion 51 is disposed on a side far from the wearer US can also be achieved.

Further, the central member 50 has a smoothly coupled configuration without having a curve portion (bent portion), but the present application is also applicable to a configuration having a curve portion (bent portion).

Further, since the central member 50 is accurately positioned and fixed with respect to the left and right light-guiding members 10a and 10b, the central member 50 may be used as a positioning reference for attaching the display element 80.

In the description above, the display element 80 is an organic EL display panel or an LCD panel, but the display element 80 may be a self-luminous display element represented by an LED array, a laser array, a quantum dot light-emitting element, and the like. Furthermore, the display element 80 may be a display using a laser scanner that combines a laser light source and a scanner. Note that a liquid crystal on silicon (LCOS) technique can also be used instead of an LCD panel.

The virtual image forming optical portions 101a and 101b may block outside light by covering the front of the eye. In this case, an external scene cannot be directly observed, but an external scene captured by the camera can be observed.

As described above, an optical device in a specific aspect includes a first optical member and a second optical member configured to guide images corresponding to left and right eyes, a coupling member configured to couple the first optical member and the second optical member, and a protruding portion provided on the coupling member and extending in a lateral direction in which the first optical member and the second optical member are aligned.

In the optical device described above, the coupling member is provided with the protruding portion extending in the lateral direction in which the first optical member and the second optical member are aligned, and thus holding strength at a coupling place can be maintained when the first optical member and the second optical member are coupled together while maintaining a reduction in size of the device, and, for example, distortion, deformation, and the like of the device can be suppressed.

In a specific aspect, the coupling member forms a recess-shaped portion hollowed between the first optical member and the second optical member, and the protruding portion is provided on a hollowed side of the recess-shaped portion. In this case, while the recess-shaped portion allows the nose pad and the like to be provided, strength can be maintained by the protruding portion. Further, for example, the protruding portion can be less likely to unintentionally reflect video light, outside light, and the like for image display and to cause stray light.

In another aspect, the protruding portion is disposed offset, in a position of the coupling member, to be on a front side that is close to a wearer while wearing. In this case, when a member such as a nose pad, a shade, or a camera, for example, is further attached to the protruding portion, the member can be attached from the side close to the wearer, and the member can be prevented from being disposed on a side far from the wearer, that is, on a prominent side of the front.

In still another aspect, the protruding portion includes, at both ends thereof in an extending direction, a hook portion enabling attachment of a nose pad. In this case, the nose pad can be fixed to a position of the protruding portion by using the hook portion.

In still another aspect, the protruding portion is configured to cause, in the hook portion, the nose pad to slide and be inserted therein from a front side that is close to a wearer while wearing. In this case, an aspect where the nose pad is not attached from a prominent place on the front side can be adopted. Further, a structure that is less prone to disengagement even when a force generated by the contact with a nose or the like is applied during wearing can be achieved.

In still another aspect, the protruding portion is a gate portion upon injection-molding of the coupling member. In this case, the coupling member can be molded with high accuracy, and, at this time, the protruding portion can be integrally formed with the other portion.

In still another aspect, the protruding portion is a separate member that is attached and fixed to the coupling member. In this case, for example, in manufacturing of the coupling member, a member that can reinforce strength sufficient for the protruding portion can be added by retrofitting.

In still another aspect, the coupling member includes a flat surface as a counter surface relative to a surface, on a protruding portion is provided. In this case, for example, a flexible board can be wired on the counter surface.

In still another aspect, a thickness in a front-back direction of the protruding portion is equal to or greater than ¼ of a thickness in a front-back direction of the coupling member, and a thickness in a height direction of the protruding portion is equal to or greater than ⅔ of a thickness in a height direction of the coupling member. In this case, sufficient strength can be reinforced.

Further, a wearable display device in one specific aspect includes the optical device according to any of the descriptions above.

In the wearable display device described above, the coupling member of the optical device is provided with the protruding portion extending in the lateral direction in which the first light-guiding member and the second light-guiding member are aligned, and thus the first display device and the second display device can be coupled together while maintaining a reduction in size of the device, and, furthermore, strength at a place for holding can be maintained, and, for example, distortion, deformation, and the like of the device can be suppressed.

Further, a light-guiding unit in one specific aspect includes a first light-guiding member and a second light-guiding member configured to guide light of images corresponding to left and right eyes, a coupling member configured to couple the first light-guiding member and the second light-guiding member, and a protruding portion provided on the coupling member and extending in a lateral direction in which the first light-guiding member and the second light-guiding member are aligned.

In the light-guiding unit described above, the coupling member is provided with the protruding portion extending in the lateral direction in which the first light-guiding member and the second light-guiding member are aligned, and thus the first light-guiding member and the second light-guiding member can be coupled together while maintaining a reduction in size of the device, and, furthermore, strength at a place for holding can be maintained, and, for example, distortion, deformation, and the like of the light-guiding unit can be suppressed.

What is claimed is:

1. An optical device, comprising:
   a first optical member that has optical transparency and that has a light emitting portion emitting a first image light to a left eye of a user along a first direction;
   a second optical member that has optical transparency and that has a light emitting portion emitting a second image light to a right eye of the user along the first direction;
   a coupling member that has optical transparency and that couples the light emitting portion of the first optical member and the light emitting portion of the second optical member; and
   a protruding portion that is provided on the coupling member and extending in a second direction in which the first optical member and the second optical member are aligned,
   wherein
   the coupling member has a recess-shaped portion that hollows to one side of a third direction from another side of the third direction, the third direction intersecting with the first direction and the second direction,
   the protruding portion is provided on the recess-shaped portion, and
   the protruding portion extends to the another side of the third direction from the one side of the third direction.

2. The optical device according to claim 1, wherein
   the protruding portion is disposed offset, in a position of the coupling member, to be on a front side that is close to a wearer while wearing.

3. The optical device according to claim 1, wherein
   the protruding portion includes, at both ends thereof in an extending direction, a hook portion, and
   a nose pad is attached to the hook portion.

4. The optical device according to claim 3, wherein
   the protruding portion is configured to cause, in the hook portion, the nose pad to slide and be inserted therein from a front side that is close to a wearer while wearing.

5. The optical device according to claim 1, wherein
   the protruding portion is a gate portion upon injection-molding of the coupling member.

6. The optical device according to claim 1, wherein
   the protruding portion is a separate member that is attached and fixed to the coupling member.

7. The optical device according to claim 1, wherein
   the coupling member includes a flat surface as a counter surface relative to a surface, on which the protruding portion is provided.

8. The optical device according to claim 1, wherein
   a thickness in a front-back direction of the protruding portion is equal to or greater than 1/4 of a thickness in a front-back direction of the coupling member, and
   a thickness in a height direction of the protruding portion is equal to or greater than 2/3 of a thickness in a height direction of the coupling member.

9. A wearable display device comprising the optical device according to claim 1.

10. A light-guiding unit, comprising:
    a first light-guiding member that has optical transparency and that has a light emitting portion emitting a first image light to a left eye of a user along a first direction;
    a second light-guiding member that has optical transparency and that has a light emitting portion emitting a second image light to a right eye of the user along the first direction;
    a coupling member that has optical transparency and that couples the light emitting portion of the first light-guiding member and the light emitting portion of the second light-guiding member; and
    a protruding portion that is provided on the coupling member and extending in a second direction in which the first light-guiding member and the second light-guiding member are aligned,
    wherein
    the coupling member has a recess-shaped portion that hollows to one side of a third direction from another side of the third direction, the third direction intersecting with the first direction and the second direction,
    the protruding portion is provided on the recess-shaped portion, and
    the protruding portion extends to the another side of the third direction from the one side of the third direction.

* * * * *